(12) United States Patent
Wiser et al.

(10) Patent No.: US 11,689,443 B2
(45) Date of Patent: Jun. 27, 2023

(54) CHIP TO CHIP NETWORK ROUTING USING DC BIAS AND DIFFERENTIAL SIGNALING

(71) Applicant: Redpine Signals, Inc., San Jose, CA (US)

(72) Inventors: Robert Wiser, Santa Cruz, CA (US); Venkat Mattela, San Jose, CA (US); Wei Xiong, Mountain View, CA (US)

(73) Assignee: Ceremorphic, Inc., San Jose, CA (US)

( * ) Notice: Subject to any disclaimer, the term of this patent is extended or adjusted under 35 U.S.C. 154(b) by 81 days.

(21) Appl. No.: 17/334,703

(22) Filed: May 29, 2021

(65) Prior Publication Data

US 2022/0385565 A1 Dec. 1, 2022

(51) Int. Cl.
*H04L 45/02* (2022.01)

(52) U.S. Cl.
CPC .................. *H04L 45/08* (2013.01)

(58) Field of Classification Search
CPC ....... H04L 1/1671; H04L 41/16; H04L 45/08; H04L 45/121; H04L 49/15; H04L 49/1584; H04L 49/25; H04L 49/251
See application file for complete search history.

(56) References Cited

U.S. PATENT DOCUMENTS

| | | | | |
|---|---|---|---|---|
| 2010/0017661 A1* | 1/2010 | Queck | ............... | H04L 12/40006 714/E11.079 |
| 2017/0195972 A1* | 7/2017 | Drogi | .................... | H03F 1/0227 |
| 2019/0304351 A1* | 10/2019 | Zheng | ...................... | G09G 3/20 |

* cited by examiner

*Primary Examiner* — Kan Yuen
(74) *Attorney, Agent, or Firm* — File-EE-Patents.com; Jay A. Chesavage

(57) ABSTRACT

A node mesh contains an originating node and several node groups, each node group consisting of one or more nodes with interfaces connected to other nodes of the node group. Each node of a node group has an associated route table with an association between an applied DC voltage and an output interface to couple the input signal to. When the originating node outputs a DC voltage accompanied by differential signaling, each node in turn directs the DC voltage and differential signaling to an output interface as directed by the node local route table to a local termination in a node, which may be coupled to a training processor of inference processor for machine learning applications.

19 Claims, 9 Drawing Sheets

Required Node Interconnects

Resulting computed Physical Routes, config #1

Required Node Interconnects

Resulting computed Physical Routes, config #2

Required Node Interconnects

Resulting computed Physical Routes, config #3

Reconfigurable Node

Crosspoint Switch Node Reconfiguration

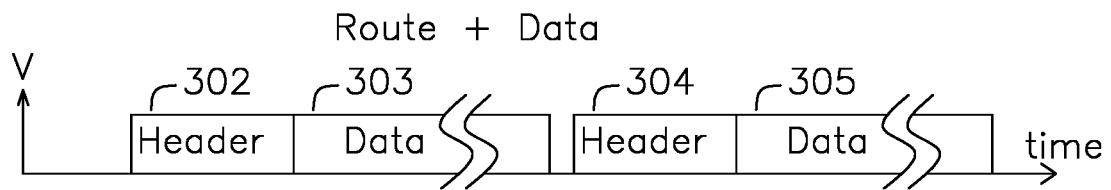
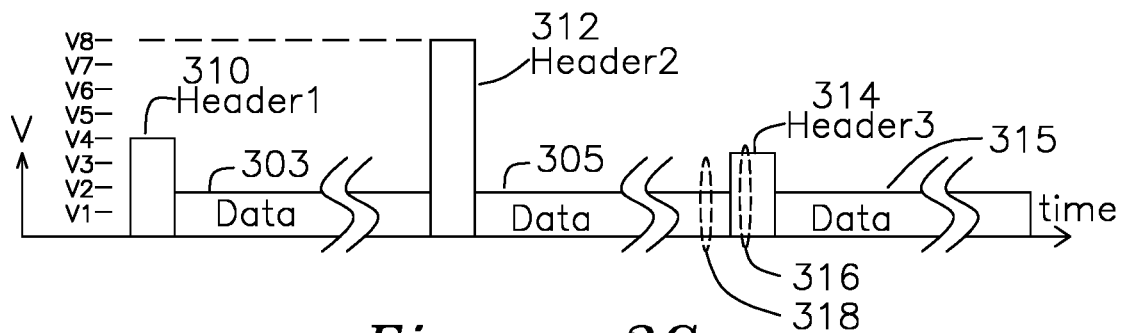
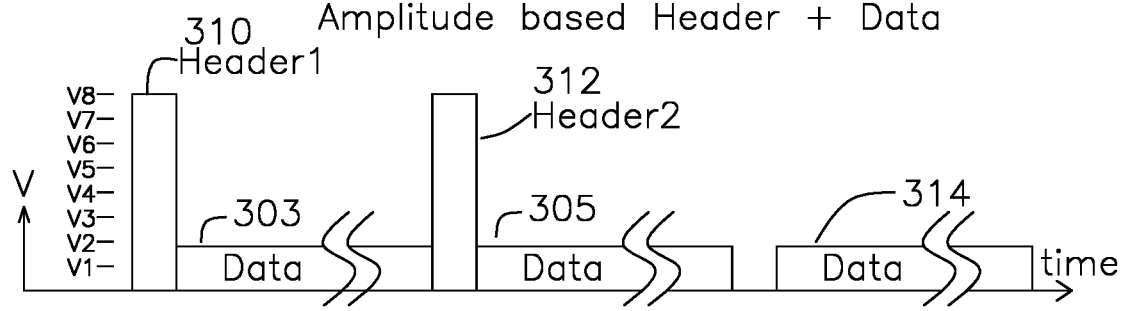
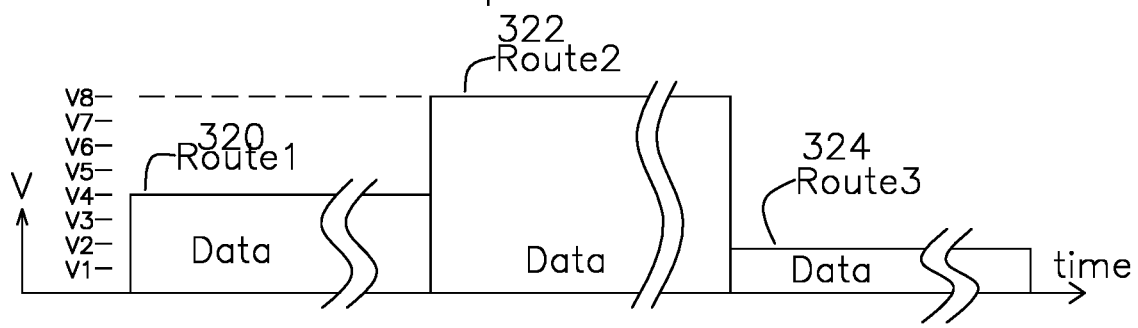

Route + Data

Hdr/Data Mux

Figure 4A
R Group Config for Vi
T=Terminate Local, R=Right, L=Left, U=Up, D=Down
| Amplitude | R1 | R2 | R3 | R4 | R5 | R6 |
|---|---|---|---|---|---|---|
| V1±.5V1 | T | | | | | |
| V2±.5V1 | R | T | | | | |
| V3±.5V1 | D | | T | | | |
| V4±.5V1 | R | D | | T | | |
| V5±.5V1 | D | | D | | T | |
| V6±.5V1 | R | R | | D | | T |
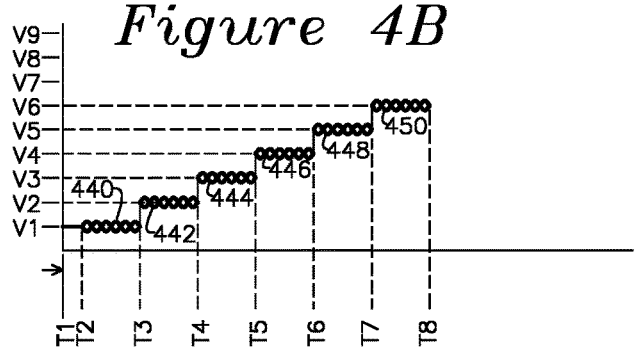
Figure 4B
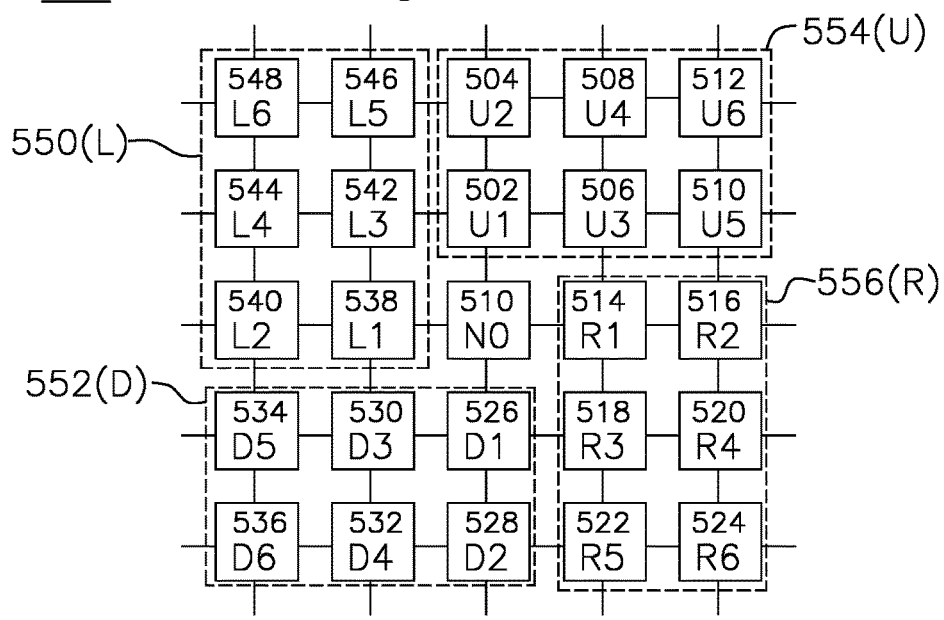
Figure 5A

| 548 L6 | 546 L5 | 504 U2 | 508 U4 | 512 U6 |
|---|---|---|---|---|
| 544 L4 | 542 L3 | 502 U1 | 506 U3 | 510 U5 |
| 540 L2 | 538 L1 | 510 N0 → | 514 R1 | 516 R2 |
| 534 D5 | 530 D3 | 526 D1 | 518 R3 | 520 R4 |
| 536 D6 | 532 D4 | 528 D2 | 522 R5 | 524 R6 |

| 548 L6 | 546 L5 | 504 U2 | 508 U4 | 512 U6 |
|---|---|---|---|---|
| 544 L4 | 542 L3 | 502 U1 | 506 U3 | 510 U5 |
| 540 L2 | 538 L1 | 510 N0 → | 514 R1 → | 516 R2 |
| 534 D5 | 530 D3 | 526 D1 | 518 R3 | 520 R4 |
| 536 D6 | 532 D4 | 528 D2 | 522 R5 | 524 R6 |

Node Receiver

CHIP TO CHIP NETWORK ROUTING USING DC BIAS AND DIFFERENTIAL SIGNALING

FIELD OF THE INVENTION

The present invention relates to a system and method for a reconfigurable mesh network. In particular, the invention relates to an array of nodes such as integrated circuit nodes in a mesh configuration which are periodically reconfigurable in a machine learning architecture.

BACKGROUND OF THE INVENTION

A recent development in machine learning is the use of Convolutional Neural Networks (CNN), a particular architecture known as the deep Residual Network (ResNet) has come into expanded use because of its greater success in identifying patterns. Although increasing the number of convolutional layers is expected to provide greater accuracy, the back-propagation of the gradient results in reducing the magnitude of the gradient, a limitation of depth known as the vanishing gradient problem.

Prior art nodes with fixed interconnects have used a store and forward topology or cut-through switching on non-blocking switch fabric, where an available route is either determined based on existing available route resources, or is forwarded according to a priority or other metric. In these prior art networks, little is known about the length of connection, amount of data to route, and each route is asynchronous to other routes. By contrast, machine learning (ML) utilizes a large amount of compute resources performed in parallel, each compute resource operating for a known (or computable) interval of time, which is controllable by data rate in passing data from one node to a next node. In many cases, the route configuration may be static for long periods of time and comparatively large amounts of data must be transported through the series of interconnected nodes to reach a machine learning inference, which is the form of output of the machine learning network. The route configuration for a particular ML problem may be static, requiring the route be provided only once per power-up or initialization cycle Because of the size of the ML networks and large number of nodes, optimizing the communication links for minimum power consumption is desirable. Alternatively, it may be desired to provide a dynamically programmable architecture which provides flexible routing in ML applications where training and inference are programmable events over pre-determined intervals of time. These characteristics of machine learning require a new approach to data transmission and network routing.

Prior art packets are routed according to a message which contains a packet header containing information such as a packet type, sending node information and destination node information presented in discrete fields according to packet type followed by packet data. In this prior art routing system, the header fields must be individually decoded, the location of a destination address identified, and the packet routed to that destination, typically using what is known as "store and forward" whereby the packet data is stored and forwarded and the header field re-written with new field data, which increases the memory and power consumption requirements for the system.

It is desired to provide an interconnected mesh of machine learning nodes with communications interfaces, the computational nodes and communications interfaces operable to be infrequently reconfigured for interconnect routes, and the output drivers and input receivers operable to have equalizations performed such as output drive, slew rate, and input threshold level to select an optimize bit rate while minimizing power consumption. It is also desired to provide a computational architecture and routing fabric which provides dynamic routing and configuration for training intervals and inference intervals. It is additionally desired to provide an improved mesh fabric for cut-through routing whereby a packet is instantly directed to a destination node based on an instantaneous identification of route based on physical characteristics of the incoming packet and without the use of digital header field, or optionally with a header field and route information based on the physical characteristics.

OBJECTS OF THE INVENTION

A first object of the invention is a mesh fabric for machine learning comprising an originating node coupled to a plurality of node groups, each node group comprising a plurality of nodes, each node having a local route table associating a DC voltage accompanied by differential signaling and applied to an output interface, such that when the originating node outputs a DC voltage accompanied by differential signaling, each node of the node groups routes the DC and differential signaling to a local termination of one of the nodes of a node group.

A second object of the invention is a node for a node group, the node having a plurality of input ports, a plurality of output ports, and a route table providing a relationship between an applied DC voltage of an input port and connectivity from the input port to an associated output port according to the route table.

A third object of the invention is a node mesh comprising an originating node and a plurality of interconnected nodes, the originating node generating at least one message comprising a header followed by data, the header having a variable amplitude and the data having comparatively uniform amplitude, the message coupled to a node of the plurality of interconnected node, each node of the plurality of interconnected nodes maintaining a route table associating a header amplitude received on an input interface of the node to an output interface, each node coupling an input interface to an output interface according to a header amplitude, at least one node of the node mesh being a terminating node receiving the message after passing through one or more nodes of the node mesh.

A fourth object of the invention is a method for routing messages comprising a header followed by data, the method operative on nodes of a node mesh comprising an originating node and a plurality of interconnected nodes, each node having an input coupled to a route table for examination of a header amplitude and associating a header amplitude with an output interface of the node, the method comprising:

the originating node sending a message to an output interface coupled to a node of the node mesh;

each node of the node mesh which receives a message examining the amplitude of the header and coupling the message to an output interface as indicated by the amplitude of the header.

SUMMARY OF THE INVENTION

An array of computational nodes is arranged in a rectangular array, each computational node interconnected to an adjacent node with a communications interface, each communication interface including at least one output driver at a transmitting node of the communication interface coupled to a corresponding receiver at a receiving node communication interface. In one example of the invention, nodes are arranged in a rectangular array, each node having a plurality of communication interfaces, each communication interface having an output driver and input receiver coupled to an adjacent node communication interface input receiver and output driver such that each node is operable to communicate bidirectionally with two adjacent horizontal nodes (designated R Right and L Left in a plan view of the rectangular array) and two adjacent vertical nodes (designated T Top and B Bottom) with respect to an originating node. In a first example of the invention, the communication interface interconnections between adjacent nodes T (Top) B (Bottom) R (Right) and L (Left) are reconfigured by a periodic transmission of a header field followed by data, the header field including at least one of route configuration, output driver drive strength, output driver voltage level, input receiver switching threshold, transmit encoding type, and other information which provides at least one of: routing information, or interface characteristics such as speed, signaling type, or signal quality information. In cases where the current configuration can be used with data to be transmitted, a header which precedes the data field is optionally transmitted, where the data field may include machine learning coefficients or a machine learning input data stream for end node processing.

BRIEF DESCRIPTION OF THE DRAWINGS

FIG. 3A shows a time sequence of route and data information for transmission from an originating node to at least one surrounding node.

FIG. 3B shows a time sequence of amplitude based header communication followed by data.

FIG. 3C shows an example of constant amplitude header communication followed by data.

FIG. 3D shows an example of route information encoded using data field amplitude.

FIG. 3E shows plots of waveforms for various signal encoding methods.

FIG. 3F shows a partial schematic diagram for a transmit driver and a receiver of a communications interface with separate transmit drivers.

FIG. 3F-1 shows a plot of waveforms for a header and data separator at a receiver.

FIG. 3G shows a partial schematic diagram for a transmit driver and a receiver for a communications interface with a single transmit driver.

FIG. 3H shows a schematic diagram of an LVDS driver with DC superposition.

FIG. 4A shows an example routing table for a Right (R) group of nodes of FIG. 5A.

FIG. 4B shows a waveform plot for routing and data communication through the nodes of FIG. 5A.

FIG. 5A shows a subset of a network of nodes arranged in a group of L, R, T, B nodes with respect to an originating node N0.

FIGS. 5B, 5C, 5D, 5E, 5F, and 5G show a sequence of node route configurations for the waveform of FIG. 4B.

DETAILED DESCRIPTION OF THE INVENTION

FIGS. 1A and 1B, 1C and 1D, 1E and 1F, each show a required node interconnection and respective resulting computed configuration for nodes 102, 104, 106, 108, 110, 112, 114, 116 and 118 arranged in a rectangular array. In one example of the invention, each node is a computational processor performing machine learning (ML) computations such as multiply and accumulate operations between a stream of input values and an occasionally updated coefficient matrix, where the input values which may represent part of an image or other digital input for the ML system to form an inference.

Figure 1A:
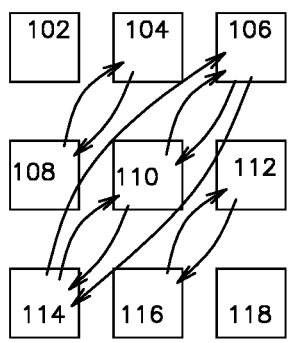
FIG. 1A is a diagram for exemplar required interconnections in a 3×3 rectangular array of nodes.

In the example of FIG. 1A, the arrows represent desired communication interconnects in a first configuration, such that node 108 has data to send to node 104, which has data to send to 108, node 114 has a first block of data to send to 110 and also a second block of data to send to 106, and node 110 has return data to send to node 114.

Figure 1B:
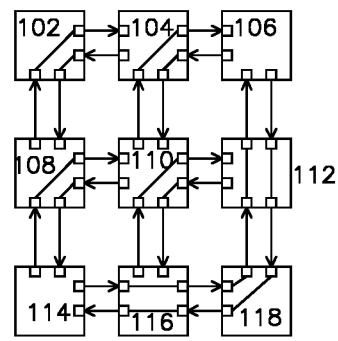
FIG. 1B is a diagram of computed physical routes for FIG. 1A.

The routes which provide the desired connectivity are pre-computed, and shown in FIG. 1B. Each node 102, 104, 106, etc. of the rectangular array has an "Up" (U), "Right" (R), "Down" (D) and "Left" (L) communications interface, which have communications connections to an adjacent node which also has corresponding U, R, D, and L input/output (IO) interfaces to route the data stream from an originating node to an adjacent node and beyond so as to complete the required node interconnects between nodes and to provide connectivity for the data stream and periodic coefficient updates. Each communication interface has an input and an output. For example, the connections from node 108 to node 104 and node 114 to node 106 of FIG. 1A are performed using communications interface connections from node 108 to node 102 to node 104, and node 114 to node 116 to node 118 to node 112 to node 106, respectively. Each node thereby provides the required connectivity using available U, R, L and D communication interface interconnects, as required, and T (a destination indicator in the route table) may be used to indicate a local route termination for processing by a local processor, which may optionally result in transmission of processed data to a different interface and routed to a different node using a route protocol of the present invention.

Figure 1C:
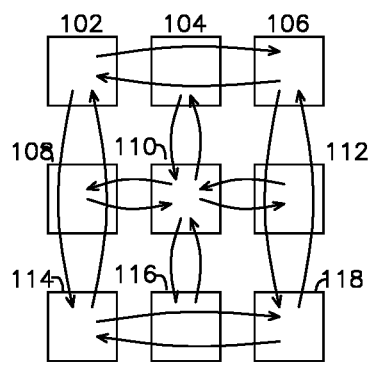
FIG. 1C is a diagram for required interconnections in a 3×3 rectangular array of nodes.
Figure 1D:
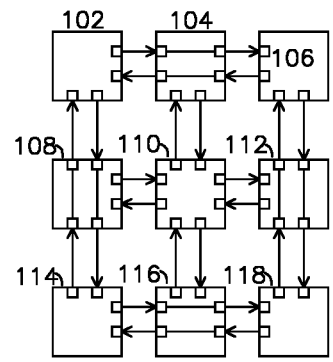
FIG. 1D is a diagram of computed physical routes for FIG. 1C.
Figure 1E:
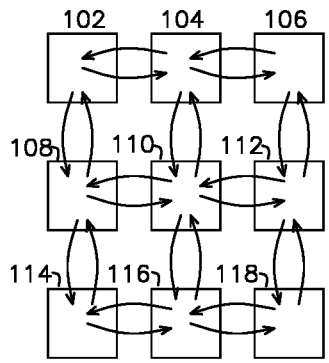
FIG. 1E is a diagram for required interconnections in a 3×3 rectangular array of nodes.
Figure 1F:
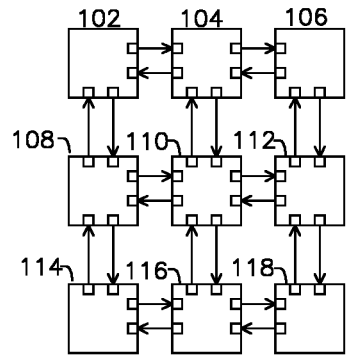
FIG. 1F is a diagram of computed physical routes for FIG. 1E.

FIG. 1D shows a subsequent physical connection computed from the required node interconnects of FIG. 1C, and FIG. 1F shows a subsequent physical connection computed from the required node interconnects of FIG. 1E. Each individual configuration and re-configuration is pre-computed based on the specific ML problem at hand which has fixed and pre-computed computation time based on the number of multiply-accumulate operations, and the amount of data to be forwarded to a subsequent node for inclusion in a computation with computation results from other nodes.

Figure 2A:
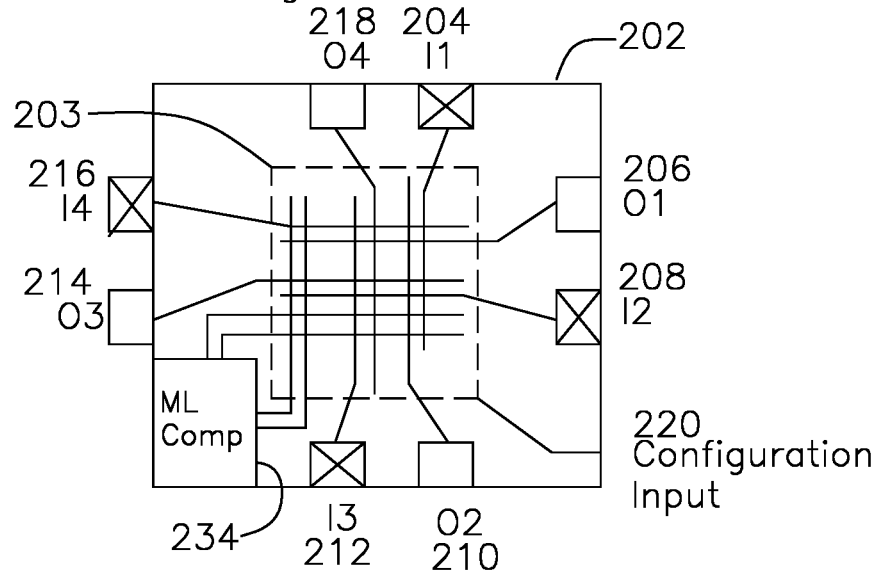
FIG. 2A is a diagram for a reconfigurable node with communication interfaces of FIG. 1B, 1D, or 1F.

FIG. 2A shows a ML computation processor 234 with a configurable cross-point switch fabric 203 for communication interface inputs and outputs in an example node 202 communication interface. Inputs I1 204, I2 208, I3 212, and I4 216 are provided to cross-point switch fabric 203, and the inputs are variously connected to communication interface outputs O1 206, O2 210, O3 214, and O4 218 according to a route configuration received by an active communication interface input. External configuration input 220 may be used for downloading executable code, initial our updated routing table assignments, or other out-of-band configuration information not related to the ML routing and data streams.

Figure 2B:
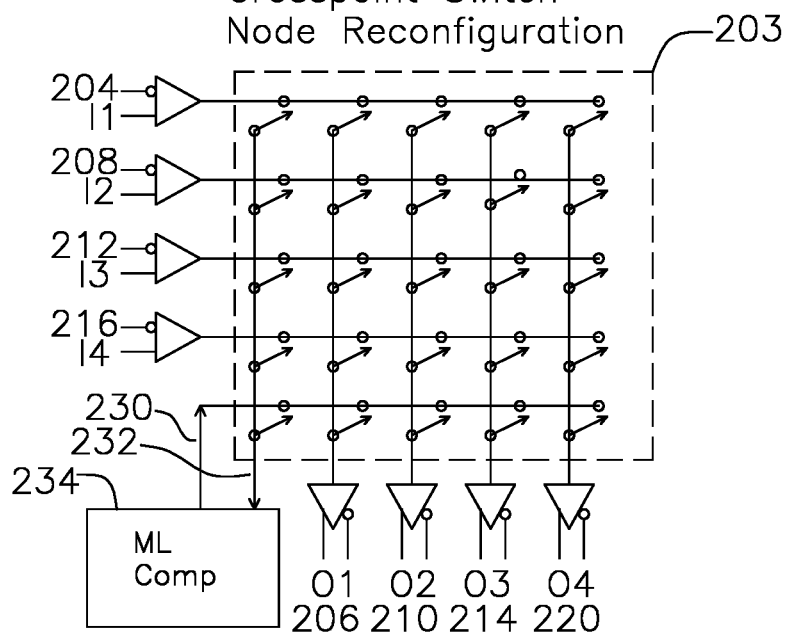
FIG. 2B is a schematic diagram for a cross-point switch for the reconfigurable node of FIG. 2A.

FIG. 2B shows an example cross-point switch fabric 203, where each switch is operable to switch any communication interface input I1 204, I2 208, I3 212, and I4 216 to any communication interface output O1 206, O2 210, O3 214, and O4 220 on a per-input and per-output basis. A "blocking" condition exists when more than one input needs to route through a node to the same output. The blocking condition is avoided by computation of the routes and assignment of computation to cores using metrics which provide the greatest likelihood of route completion, and iterating on the result, if necessary. This is uniquely possible in ML algorithms because the computations and computational steps are known a-priori. The communication interface inputs and outputs of node 202 are shown as differential pairs in FIG. 2B, however the connections may be of any time, including serial synchronous, serial asynchronous, a parallel bus such as PCI, or any means for a point to point communication. The ML computation processor 234 is also operable to be coupled to the cross-point fabric inputs and outputs for receiving or sending training data, or ML data with routing information to other nodes for computing inferences.

FIG. 3A shows an example time sequence of packets comprising a header 302 followed by data 303, which may be transmitted as back to back fields or separated in time with respect to subsequent header 304 and data 305 packets. The packets are transmitted from one node to another using any signaling protocol, including a self-clocking serial protocol or an externally clocked protocol such as PCI, and the header and data fields may be related to training data for machine learning, or header and data for performing inferences.

Figures 1, 3E, 3F, 3G, 3H:
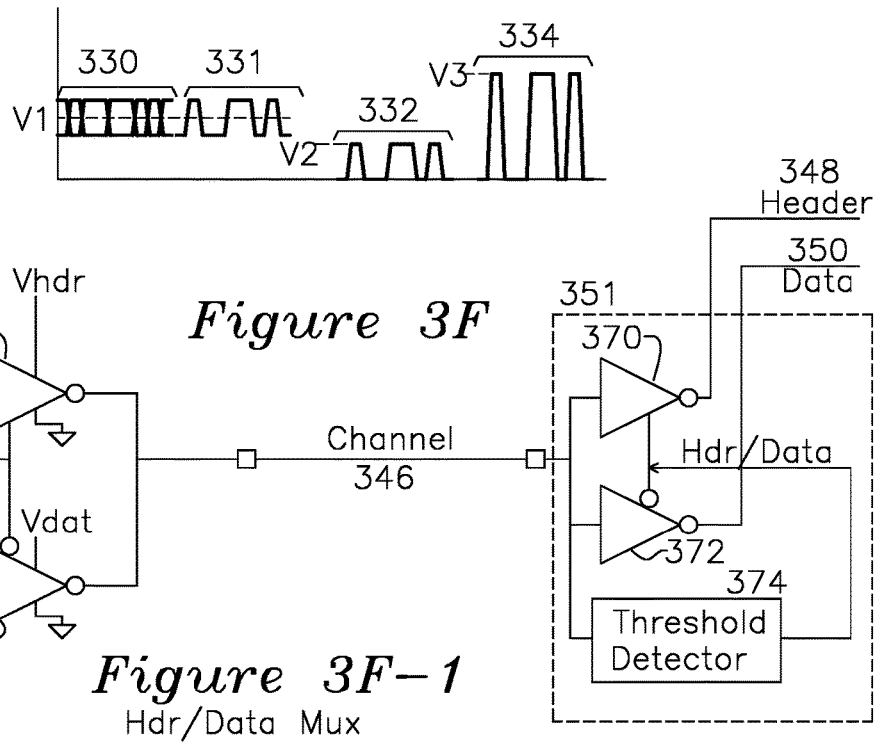

FIG. 3B shows a first example of header fields 310, 312, and 314 which include amplitude encoding of route information, followed by data fields 303, 305, 315. In one example of the invention, fields with an amplitude which exceeds a threshold value such as V2 indicate a routing header and fields above that threshold are interpreted as header fields carrying route information according to the amplitude level. In one example of the invention shown in FIG. 3B, each node such as originating node 110 of FIG. 1 may have each communication interface output associated with a particular voltage level above V2 for a header 310 and 312, such that the detection of a header amplitude corresponding to one of four voltage levels indicates the data is to be routed to an associated one of the four adjacent nodes, and a fifth voltage level may indicate that the route path is local to the originating node 110. For example, V3 may be associated with routing to the U communication interface, V4 associated with routing to the R communication interface, etc., where U(Up) and R(Right) indicate a plan communication interface such as 204/218 or 206/208, respectively, of FIG. 2A. The subsequently transmitted data 303 is then directed to the selected node. The subsequent header 312 similarly is used to provide amplitude-based routing information to configure a route path for the subsequent data packet 305, as with header 314 and data 315. In this method, header fields are distinguishable from data fields by amplitude level, with the header fields having greater amplitude than the data fields.

In another example of the invention shown in FIG. 3C, the header fields 310 and 312 are the same amplitude and greater in amplitude than the data fields 303, 305, and 314. The header fields 310, 312 contain control information which governs the routing or handling of subsequent data 303, as with header 312 and subsequent data 305. Where a header such as 312 establishes configuration and handling of subsequently sent data 305, additional data packets 307 without header may be transmitted until a configuration change or other event results in a need to send a header with new configuration information. The header fields and data fields may have data encoded a variety of different ways, including Low Voltage Differential Signaling (LVDS) plus a DC offset for the header fields. The differential signaling aspects of LVDS are described in the American National Standards Institute (ANSI) standard ANSI/TIA/EIA-644-A, which is incorporated by reference. The DC offset is a common mode voltage applied to the two differential signals which does not modify the differential voltage of the signal carrying the high speed data to be routed. Signals 316 and 318 may be any of the variants shown in FIG. 3E including a differential signal centered about a voltage V1 of waveform 330, a single ended signal with amplitude V2 of waveform 332, or a single ended signal with amplitude V3 greater than V2 of waveform 334.

FIG. 3D shows another method, where a separate header is not transmitted, but the amplitude of the data itself encodes route data, such as 320 at amplitude V4, 322 at amplitude V8, and 324 at amplitude V3. Where the amplitude is any measurable parameter related to amplitude, such as peak to peak amplitude, 0 to peak amplitude, or average amplitude. In this example, each data packet 320, 322, 324 is routed to one of the adjacent nodes according to the amplitude of the data itself in combination with a configurable route table that associates the data amplitude with a communication interface output or locally terminated for local use such as by a machine learning training processor or inference processor. In one example of the invention, each node may be configured to interpret routes based on header amplitude data uniquely, i.e., for one node, amplitude V4 routes to U, whereas the next node may route amplitude V4 to L. In this way, multiple hops are possible without reconditioning or modifying the associated message data.

Each of the route encoding methods of FIGS. 3A to 3D may be used separately, or combined in part or in whole. In general, an originating node sends a message comprising a header containing routing information and data for use by a node at the end of the route, with each node along the way routing the message according to the header and a local route table. The header is understood to comprise any of: a separate field of the message preceding the message data field, or the message data field may itself incorporate the header, such as where the message data comprises a DC value plus differential or single ended serial or parallel data, where the message data DC or amplitude component is associated to a communications interface output port by the route table, or the header may comprise the amplitude and/or DC offset of the message data.

The header field may include several different types of control information in addition to routing information. The header may include fields indicating required drive strength for an output driver, a DC offset value or maximum output drive amplitude, or equalization information which compensates for long passive route paths compared to active terminated or short route paths. The header field may include information related to the modulation, data rate, or coding of the data field, and may be done any variety of ways, including a few bits for each header field purpose. In one example of the invention, the amplitude of the header alone indicates a route termination node for the data, with each of the adjacent nodes associated with a header amplitude, where the node receiving a packet with a header having a particular amplitude selects an output interface and directs the subsequent data to an associated output driver.

In another example of the invention, the amplitude of the header and data field are used solely to distinguish between a header field and a data field, which allows that the routing logic be separated from the data handling, and for the routing to be implied by the incoming DC signal level as it propagates from node to node according to a route table associated with the route voltage and maintained by each node.

FIGS. 3F and 3G show example driver and receivers for a node, where the channel 346 and 360 represents the physical interconnection between nodes, which may be single ended lines (where the reference voltage is ground or a supply voltage) or differential lines, as is known in the art of signal transmission, plus a DC component carrying routing information. In FIG. 3F, the driver output amplitude between header field and data field may be switched between a header mode and a data mode with hdr/data input 342. In header mode when 342 is asserted, header driver 336 is enabled with a rail voltage of Vhdr, the input header signal 340 drives the channel 346 between ground and Vhdr voltage. In data mode when 342 is not asserted, header driver 336 is disabled and data driver 338 is enabled by control signal 342 and data input 344 causes the data driver 338 to drive the communications interface channel 346 between ground and Vdat. FIG. 3G shows a similar communications driver, with a common input 354 for both header and data, and where the output driver 356 has an output drive voltage which is switched between Vdat and Vhdr by switch 358 according to Hdr/data control signal 352.

FIGS. 3F and 3G also show receiver 351, which includes a threshold detector 374 which detects an amplitude value, such as peak, peak to peak, average, or other level on communications interface input signal on channel 346 and 360 and enables header receiver 370 outputting header data 348 when the channel 346 or 360 amplitude or voltage is above a threshold, and enables communications interface data receiver 372 when the channel data is below a threshold established by threshold detector 374. Additionally, when the channel 346 comprises a DC voltage component plus a superimposed differential (330 of FIG. 3E) or single ended (331 of FIG. 3E), the threshold detector may also operate on a DC voltage accompanying differential (such as LVDS) or single ended data, which is typically a comparatively lower p-p amplitude than the DC voltage.

The drive system of FIGS. 3F and 3G is shown as a single ended driver. FIG. 3H shows an example LVDS driver 356A carrying differential signaling data with a route encoded DC 355 input to both lines of the differential channel 360A, which may carry a superposition of LVDS (differential, but may be single-ended) signaling from driver 356A plus DC encoded header/data or DC encoded route information from DC input 355 as was described for FIGS. 3A to 3E. Receiver 351 is modified such that line receivers 370 and 372 are adapted for LVDS signaling and threshold detector 374 operates as before, on the DC 355 which is passed onto the channel 361.

Figure 5D:
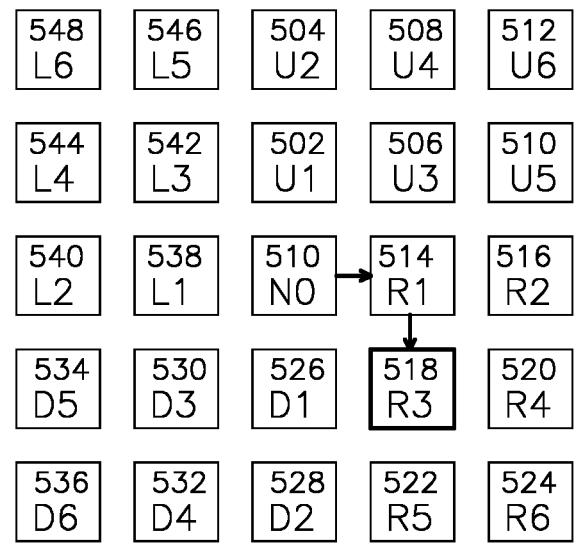
Figure 5E:
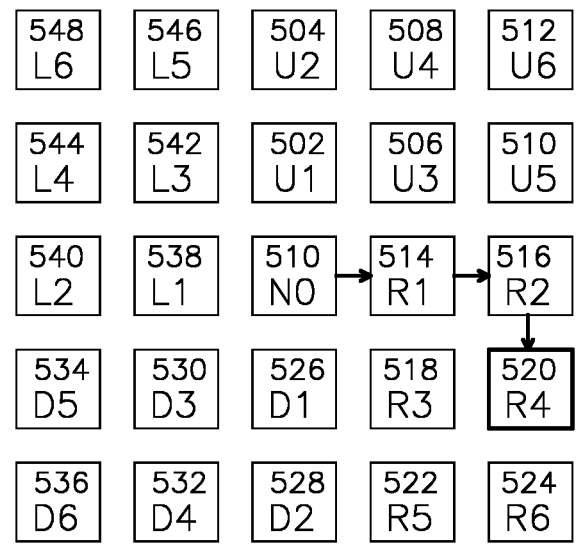
Figure 5F:
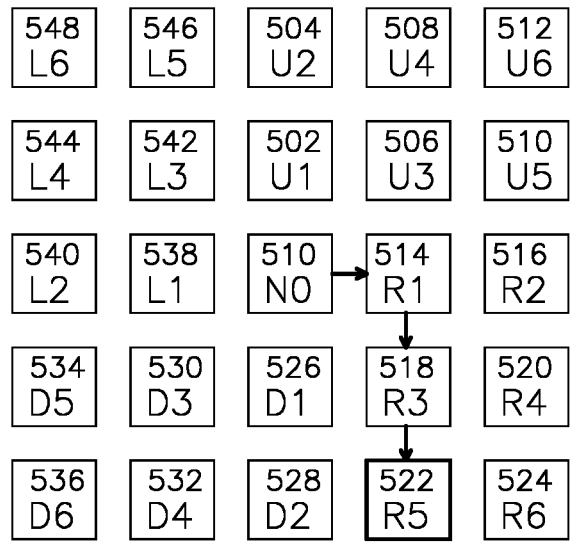
Figure 5G:
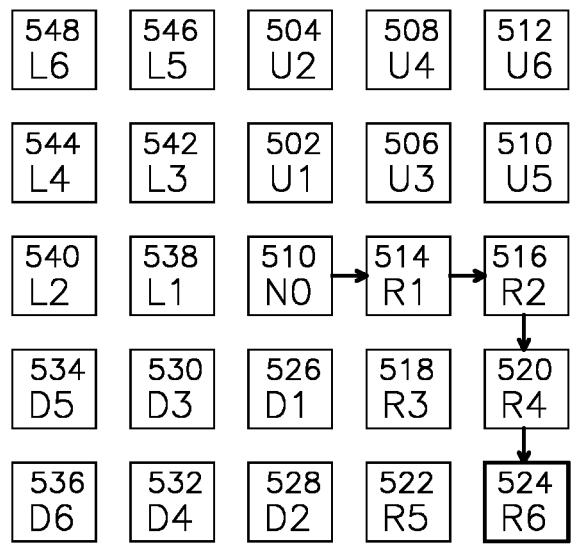

In another example of the invention, each of the nodes is interconnected as before, and an originating node sends differential (or single ended) data accompanied by DC which may be used for route information, where each node maintains a route table associating an input DC value with routing to one of the communication interface outputs U, R, D, or L; or T for local termination. FIG. 4A shows a route table 400 for a node configuration 500 of FIG. 5A, where each of the nodes surrounding originating node NO 510 are arranged in separate node groups indicated as U node group 554 comprising nodes U1 502, U2 504, U3 506, U4 508, U5 510, and U6 512. The R node group 556 comprises nodes R1 514, R2 516, R3 518, R4 520, R5 522, and R6 524. The D node group 552 comprises nodes D1 526, D2 528, D3 530, D4 532, D5 534, and D6 536. The L node group 550 comprises nodes L1 538, L2 540, L3 542, L4 544, L5 546, and L6 548. Each of the four groups of nodes is connected to communications interface of originating node NO 510 with input and output ports at each communications interface. These groups are shown for illustration of the example only, as it is clear that each node is connected to other nodes in a mesh group, and other route groupings may be used.

A primary advantage of the messages formed by LVDS digital data superimposed with DC as shown in waveforms 442, 444, 446, etc, of FIG. 4B is that each message may be routed in a "cut-through" manner from an originating node to a destination node without intermediate storage of the message or decoding of header fields, since the interface input DC level plus the local routing tables of each node unambiguously indicate the destination and route path for each message. In this method, each node need only make an analog switched connection from an input port to an output port according to the route table and output port associated with the incoming DC voltage, and to preserve the DC voltage along the route path.

Consideringly only the R node group 556 for the present example routes, each of the nodes in the R node group maintain an internal route table shown in FIG. 4A. The R1 node 514 has associated R1 route table 402 shown in bold rectangle, the R2 node maintains an R2 route table of FIG. 4A, and so on for nodes R1 514 to node R6 524.

In one example of the invention, the originating node NO 512 may output the DC voltage determining the routing according to FIG. 4A accompanied by differential signaling LVDS data fields as shown in the waveform of FIG. 4B, which is shown sending data sequentially to nodes R1 from time T2 to time T3 with LVDS data 440 (V1 of FIGS. 4A and 4B indicates the route terminates in the first node R1 514) to node R2 from T3 to T4 with LVDS data 442 (where V2 of FIGS. 4A and 4B indicates a route into first node R1 514, outputting to the R (right) output interface, and then terminating to the connected node 516 R2). LVDS data 444 from T4 to T5 routes to node R3 (where V3 indicates a route into first node R1 514 then terminating into down output interface of node R3 518). Similarly, LVDS data 446 routes to node R4 from T5 to T6, and LVDS data 448 routes to node R5 from T6 to T7, and LVDS data 450 routes to node R6 from T7 to T8, each route sequentially communicated by the respective DC voltages V1, V2, V3, V4, V5, and V6 co-propagating with the differential signaling, respectively. The route examples of FIG. 4A are shown as incremented voltages for clarity only, and the routes can occur in arbitrary order with the LVDS data superimposed on a DC voltage indicating route destination node according to the example route table of FIG. 4A, which is maintained separately by each node of a node group. With each respective node directing the data to an output interface using the route table 4A, the waveform of FIG. 4B routes as shown in subsequent FIGS. 5B through 5G.

Figure 6A:
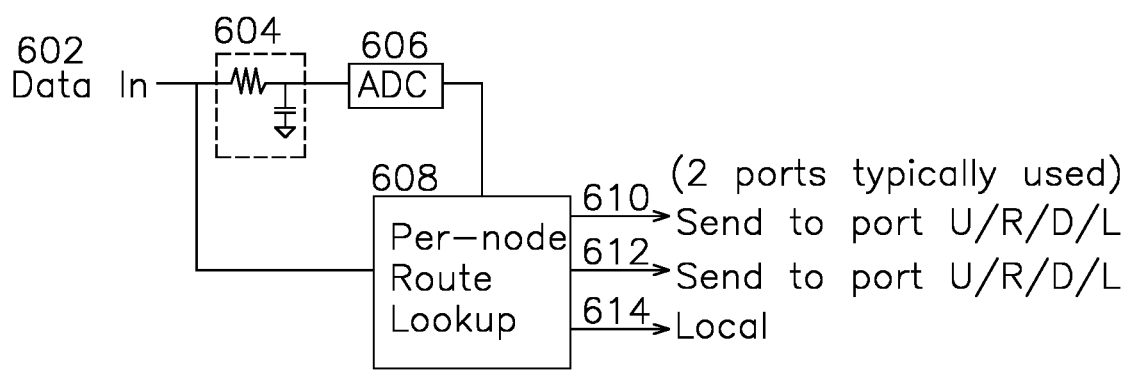
FIG. 6A shows a block diagram for an input interface route logic for a node receiver.

FIG. 6A shows an example node receiver 608, where input data 602 having a DC component added to differential (or single ended) data is applied to a low pass filter 604 to extract the route DC value, which is digitized 606 and applied to per-node route lookup 608, which directs the differential signal (or single ended signal) input data 602 to an associated output interface 610, 612, or to the local processor on interface 614. Although each node of FIG. 500 has four output interfaces, it can be seen from the particular example of FIG. 4A route table that any one node only uses two or three of the available four route directions. Other configurations of the route table and number of interfaces may be used, and the examples shown are limited for understanding the particular example embodiments of the invention only. The route table information may be communicated to each node using the out of band configuration input 220 of FIG. 2A.

The proceeding has been a description of the preferred embodiment of the invention. It will be appreciated that deviations and modifications can be made without departing from the scope of the invention, which is defined by the appended claims.

We claim:

1. A node fabric for machine learning, the node fabric comprising:
   an originating node having a plurality of communication interfaces, each communication interface of the originating node having an input and an output;
   a plurality of node groups, each node group comprising a plurality of nodes and having at least one communication interface of the plurality of nodes coupled to a communication interface of the originating node, each communications interface of a node in a node group having an input and an output;
   each node of a node group having a route table initialized with a correspondence between an incoming DC voltage applied to a communication interface input and either an communication interface output or a local termination;
   the originating node sending a DC voltage superimposed with a differential signal to a node group;
   where each node of a node group which receives the DC voltage and differential signal is configured to associate the DC voltage with a communication interface from the route table, a node of the node group which receives the DC voltage and differential signal thereafter coupling the DC voltage and differential signal to the associated communication interface output or local termination.

2. The node fabric of claim 1 where the originating node has four communication interfaces.

3. The node fabric of claim 2 where each of the originating node communication interface outputs is coupled to a different node group.

4. The node fabric of claim 1 where at least one node of a node group has four communication interfaces.

5. The node fabric of claim 1 where at least one node group comprises six nodes, each of the six nodes having as many as four communication interfaces.

6. The node fabric of claim 1 where the route table comprises an association between a DC voltage applied to a node communications interface input and one of the node communications interface outputs for coupling the DC voltage and the differential signal.

7. The node fabric of claim 1 where a route table for each node is configured through an out-of-band interface to the node.

8. The node fabric of claim 1 where a route table for each node is initialized to a default route which provides initial connectivity, and where the default routes are subsequently replaced with routes provided through a communication interface input of the node.

9. The node fabric of claim 1 where the route table for a node contains route information for machine learning training during one interval of time and route information for machine learning inference during a different interval of time.

10. The node fabric of claim 1 where at least one node of a node group further comprises a machine learning processor coupled to the local termination of a node.

11. A node fabric comprising:
   an originating node having a plurality of communication interfaces, at least one communication interface output transmitting a DC voltage accompanied by differential signaling;
   a plurality of node groups, each node group comprising a plurality of nodes, each node of a node group coupled to at least one other node of the node group through a communication interface;
   each node of a node group maintaining a route table associating a DC voltage applied to a communication interface input with either a communication interface output or a local termination;
   whereby the originating node outputs the DC voltage accompanied by differential signaling, and each node receiving the DC voltage and differential signaling is configured to couple through each node of a node group to a local termination node of the node group based on the DC voltage and according to the route table of each node of a node group.

12. The node fabric of claim 11 where the differential signaling conforms to an LVDS standard, and the DC voltage is a common mode voltage added to the differential signaling.

13. The node fabric of claim 11 where a number of unique DC voltages for routing to an end node of a node group is equal to a number of nodes in the node group.

14. The node fabric of claim 13 where the number of DC voltages is six.

15. The node fabric of claim 11 where the differential signaling comprises a stream of digital data containing at least one of training data or inference data.

16. The node fabric of claim 11 where at least one node local termination is coupled to an inference processor or a training processor.

17. The node fabric of claim 11 where the route table contains routes for training during a first interval of time and routes for inferences during a second interval of time.

18. A method for routing differential signaling in a mesh fabric comprising an originating node coupled to a plurality of node groups, each node group comprising a plurality of nodes, each node of a node group having at least one communication interface coupled to other nodes of a node group, each node having a route table containing a relationship between a DC input voltage applied to a communication interface input and a communication interface output, the method comprising:

the originating node outputting the DC input voltage accompanied by differential signaling to a node of a node group;

each node of the node group coupling an input interface having the DC input voltage accompanied by differential signaling to an output interface according to the route table and the DC input voltage;

at least one node of the node group terminating the differential signaling to a processor.

19. The method of claim 18 where the processor is at least one of a training processor or an inference processor.

* * * * *